US008315874B2

(12) United States Patent  
Barton et al.

(10) Patent No.: US 8,315,874 B2
(45) Date of Patent: Nov. 20, 2012

(54) VOICE USER INTERFACE AUTHORING TOOL

(75) Inventors: William F. Barton, Harvard, MA (US); Michelle S. Spina, Winchester, MA (US); David G. Ollason, Seattle, WA (US); Julian J. Odell, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 947 days.

(21) Appl. No.: 11/401,823

(22) Filed: Apr. 11, 2006

(65) Prior Publication Data

US 2007/0156406 A1 Jul. 5, 2007

Related U.S. Application Data

(60) Provisional application No. 60/755,436, filed on Dec. 30, 2005.

(51) Int. Cl.
*G10L 21/00* (2006.01)

(52) U.S. Cl. ............ 704/270.1; 704/270; 704/257; 704/275

(58) Field of Classification Search .......... 704/277, 704/257, 251, 270, 270.1, 275
See application file for complete search history.

(56) References Cited

U.S. PATENT DOCUMENTS

| | | | |
|---|---|---|---|
| 4,785,408 A * | 11/1988 | Britton et al. | 704/270 |
| 5,913,195 A * | 6/1999 | Weeren et al. | 704/270 |
| 6,094,635 A | 7/2000 | Scholz et al. | 704/270 |
| 6,173,266 B1 * | 1/2001 | Marx et al. | 704/270 |
| 6,188,977 B1 | 2/2001 | Hirota | 704/9 |
| 6,314,402 B1 * | 11/2001 | Monaco et al. | 704/275 |
| 6,374,242 B1 | 4/2002 | Childs et al. | 707/6 |
| 6,456,699 B1 * | 9/2002 | Burg et al. | 379/88.17 |
| 6,532,444 B1 | 3/2003 | Weber | 704/257 |
| 6,629,066 B1 | 9/2003 | Jackson et al. | 704/9 |
| 7,117,158 B2 * | 10/2006 | Weldon et al. | 704/270 |
| 7,606,714 B2 * | 10/2009 | Williams et al. | 704/275 |

(Continued)

FOREIGN PATENT DOCUMENTS

WO  WO 01/91110 A1  11/2001
WO  WO 03/003241     9/2003

OTHER PUBLICATIONS

A Word Graph Interface for a Flexible Concept Based Speech Understanding Framework, Eurospeech 2001—Scandinavia, 4 pages.

(Continued)

*Primary Examiner* — Talivaldis Ivars Smits
*Assistant Examiner* — Shaun Roberts
(74) *Attorney, Agent, or Firm* — Merchant & Gould

(57) ABSTRACT

A voice user interface authoring tool is configured to use categorized example caller responses, from which callflow paths, automatic speech recognition, and natural language processing control files can be generated automatically within a single, integrated authoring user interface. A voice user interface (VUI) design component allows an author to create an application incorporating various types of action nodes, including Prompt/Response Processing (PRP) nodes. At runtime, the system uses the information from each PRP node to prompt a user to say something, and to process the user's response in order to extract its meaning. An Automatic Speech Recognition/Natural Language Processing (ASR/NLP) Control Design component allows the author to associate sample inputs with each possible meaning, and automatically generates the necessary ASR and NLP runtime control files. The VUI design component allows the author to associate the appropriate ASR and NLP control files with each PRP node, and to associate an action node with each possible meaning, as indicated by the NLP control file.

15 Claims, 6 Drawing Sheets

U.S. PATENT DOCUMENTS

| | | | |
|---|---|---|---|
| 8,024,196 B1* | 9/2011 | Wodtke et al. | 704/277 |
| 2002/0013694 A1 | 1/2002 | Murata et al. | 704/9 |
| 2003/0115289 A1* | 6/2003 | Chinn et al. | 709/219 |
| 2004/0236580 A1 | 11/2004 | Bennett | 704/270.1 |
| 2004/0243394 A1 | 12/2004 | Kitamura | 704/9 |
| 2005/0125232 A1* | 6/2005 | Gadd | 704/270.1 |
| 2005/0132261 A1* | 6/2005 | Da Palma et al. | 714/760 |
| 2005/0149319 A1 | 7/2005 | Honda et al. | 704/9 |
| 2005/0149331 A1* | 7/2005 | Ehrlich | 704/270.1 |
| 2005/0228815 A1 | 10/2005 | Carus et al. | 707/102 |
| 2006/0083357 A1* | 4/2006 | Howell et al. | 379/88.04 |

OTHER PUBLICATIONS

A Multispan Language Modeling Framework for Large Vocabulary Speech Recognition, IEEE Transactions on Speech and Audio Processing, vol. 6, No. 5, Sep. 1998, pp. 456-467.

Finite-state Multimodal Parsing and Understanding, Michael Johnston and Srinivas Bangalore, 2000, pp. 369-375.

An Online Prototype Speech-Enabled Information Access Tool using Java Speech Application Programming Interface, Anand Narayanaswami and Costas Vassiliadis, 2001 IEEE, pp. 111-115.

* cited by examiner

VOICE USER INTERFACE AUTHORING TOOL

CROSS-REFERENCE TO RELATED APPLICATIONS

This application claims the benefit of U.S. Provisional Application Ser. No. 60/755,436, entitled "SPEECH-TO-MEANING AUTHORING TOOL", filed Dec. 30, 2005, which is incorporated by reference herein.

BACKGROUND

There is frequent demand for developing a user interface specific to an application or context. This may take the form of a voice user interface, in which a user interacts with a computer by talking to it. Development of robust speech applications typically involves three distinct processes, each necessitating that the individual performing it have unique expertise. These processes are voice user interface design, automatic speech recognition grammar design, and natural language processing grammar design. The combination of different tasks involved often makes developing a speech application complicated and expensive.

The discussion above is merely provided for general background information and is not intended to be used as an aid in determining the scope of the claimed subject matter.

SUMMARY

A voice user interface authoring tool is configured to use categorized example caller responses, from which callflow paths, automatic speech recognition, and natural language processing control files can be generated automatically within a single, integrated authoring user interface. A voice user interface (VUI) design component allows an author to create an application incorporating various types of action nodes, including Prompt/Response Processing (PRP) nodes. At runtime, the system uses the information from each PRP node to prompt a user to say something, and to process the user's response in order to extract its meaning. An Automatic Speech Recognition/Natural Language Processing (ASR/NLP) Control Design component allows the author to associate sample inputs with each possible meaning, and automatically generates the necessary ASR and NLP runtime control files. The VUI design component allows the author to associate the appropriate ASR and NLP control files with each PRP node, and to associate an action node with each possible meaning, as indicated by the NLP control file.

The Summary and Abstract are provided to introduce a selection of concepts in a simplified form that are further described below in the Detailed Description. The Summary and Abstract are not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Various embodiments disclosed herein deal with a speech-to-meaning authoring tool. According to one embodiment, a speech-to-meaning authoring tool includes a combination of a voice user interface (VUI) authoring tool, and an automatic speech recognition/natural language processing (ASR/NLP) design tool. Some illustrative features of exemplary embodiments are described as follows. This includes contexts for implementation; an overview; and descriptions of various illustrative features.

Embodiments of a speech-to-meaning authoring tool can be implemented in a variety of ways. The following descriptions are of illustrative embodiments, and constitute examples of features in those illustrative embodiments, though other embodiments are not limited to the particular illustrative features described.

Various embodiments may run on or be associated with a wide variety of hardware and computing environment elements and systems. A computer-readable medium may include computer-executable instructions that configure a computer to run applications, perform methods, and provide systems associated with different embodiments. One illustrative example of this is depicted in FIG. 1.

Figure 1:
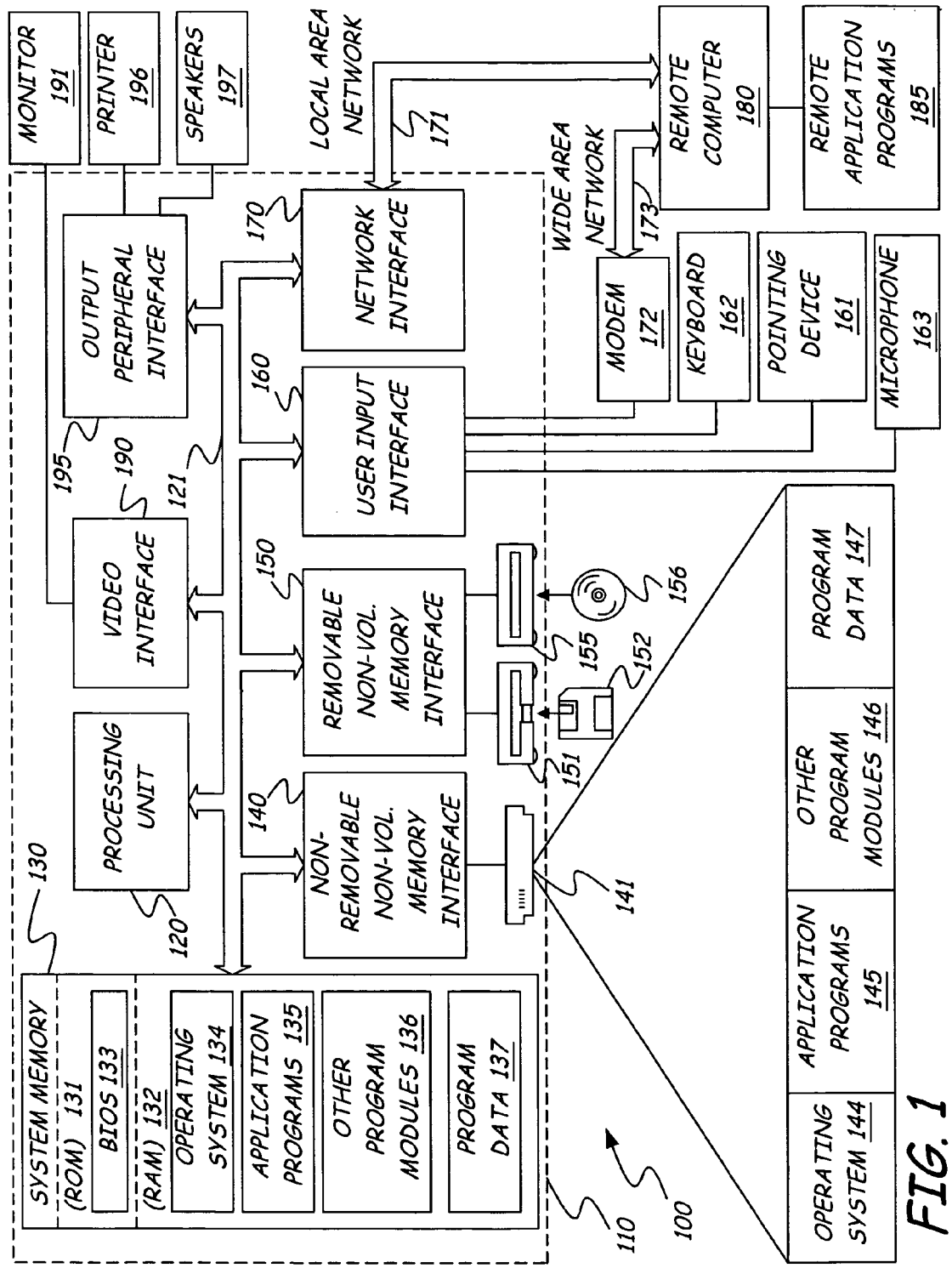
FIG. 1 depicts a block diagram of a computing environment, according to an illustrative embodiment.

FIG. 1 depicts a block diagram of a general computing environment 100, comprising a computer 110 and various media such as system memory 130, nonvolatile magnetic disk 152, nonvolatile optical disk 156, and a medium of remote computer 180 hosting remote application programs 185, the various media being readable by the computer and comprising executable instructions that are executable by the computer, according to an illustrative embodiment. FIG. 1 illustrates an example of a suitable computing system environment 100 on which various embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Various embodiments may be implemented as instructions that are executable by a computing device, which can be embodied on any form of computer readable media discussed below. Various additional embodiments may be implemented as data structures or databases that may be accessed by various computing devices, and that may influence the function of such computing devices. Some embodiments are designed to be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus; Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of Volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may be operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
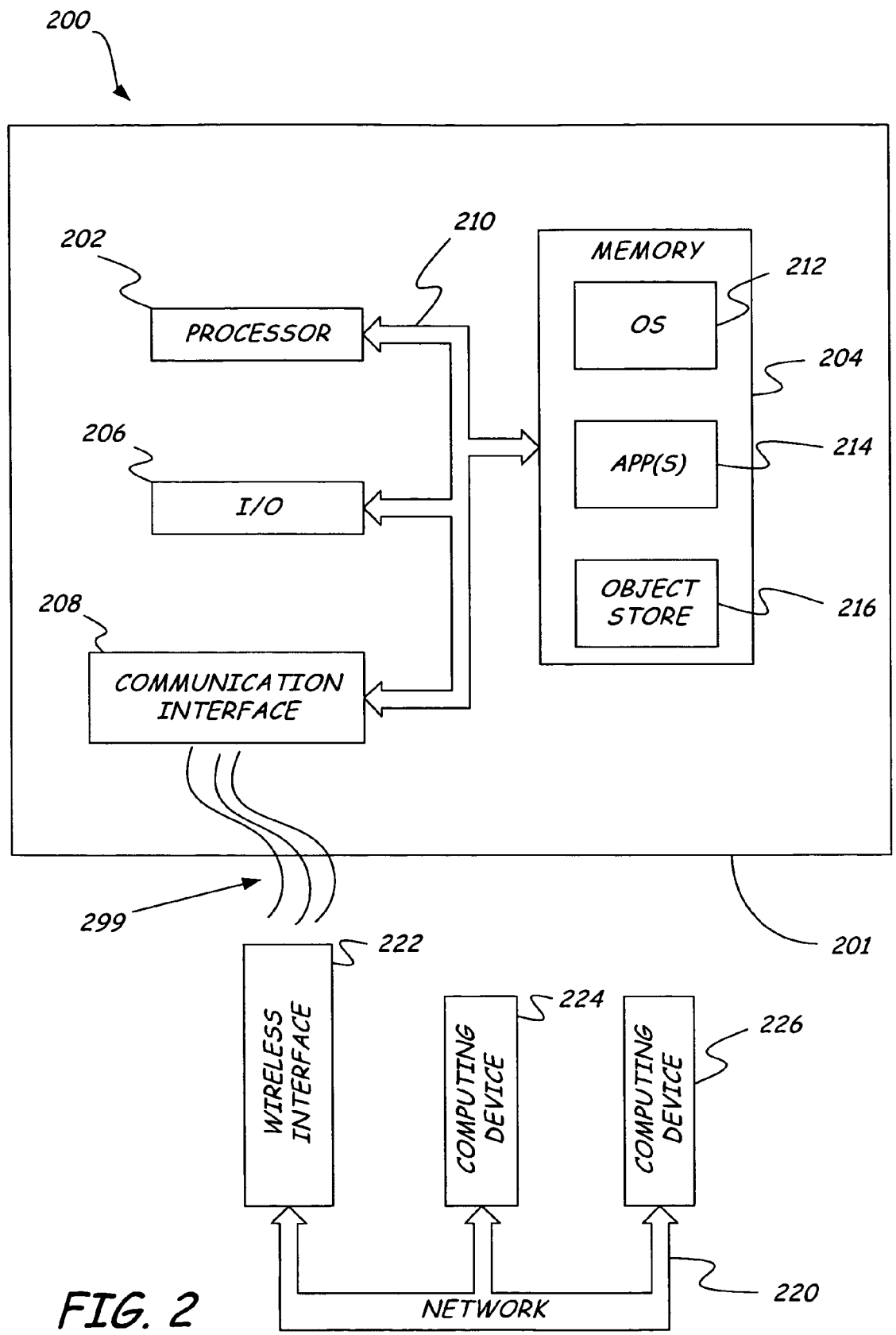
FIG. 2 depicts a block diagram of a general mobile computing environment, according to an illustrative embodiment.

FIG. 2 depicts a block diagram of a general mobile computing environment, comprising a mobile computing device and a medium, readable by the mobile computing device and comprising executable instructions that are executable by the mobile computing device, according to another illustrative embodiment. FIG. 2 depicts a block diagram of a mobile computing system 200 including mobile device 201, according to an illustrative embodiment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that enable computing device to create or access virtual worlds with semantically tagged objects according to various embodiments. For example, the executable instructions may enable mobile computing device 201 to receive input defining an object in a virtual setting, and associate a semantic annotation with the object, according to one illustrative embodiment.

Some illustrative features of exemplary embodiments that may be executed on computing devices such as computer 110 or mobile computing device 201 are described as follows. The following descriptions are of illustrative embodiments, and constitute examples of features in those illustrative embodiments, though other embodiments are not limited to the particular illustrative features described.

Figure 3:
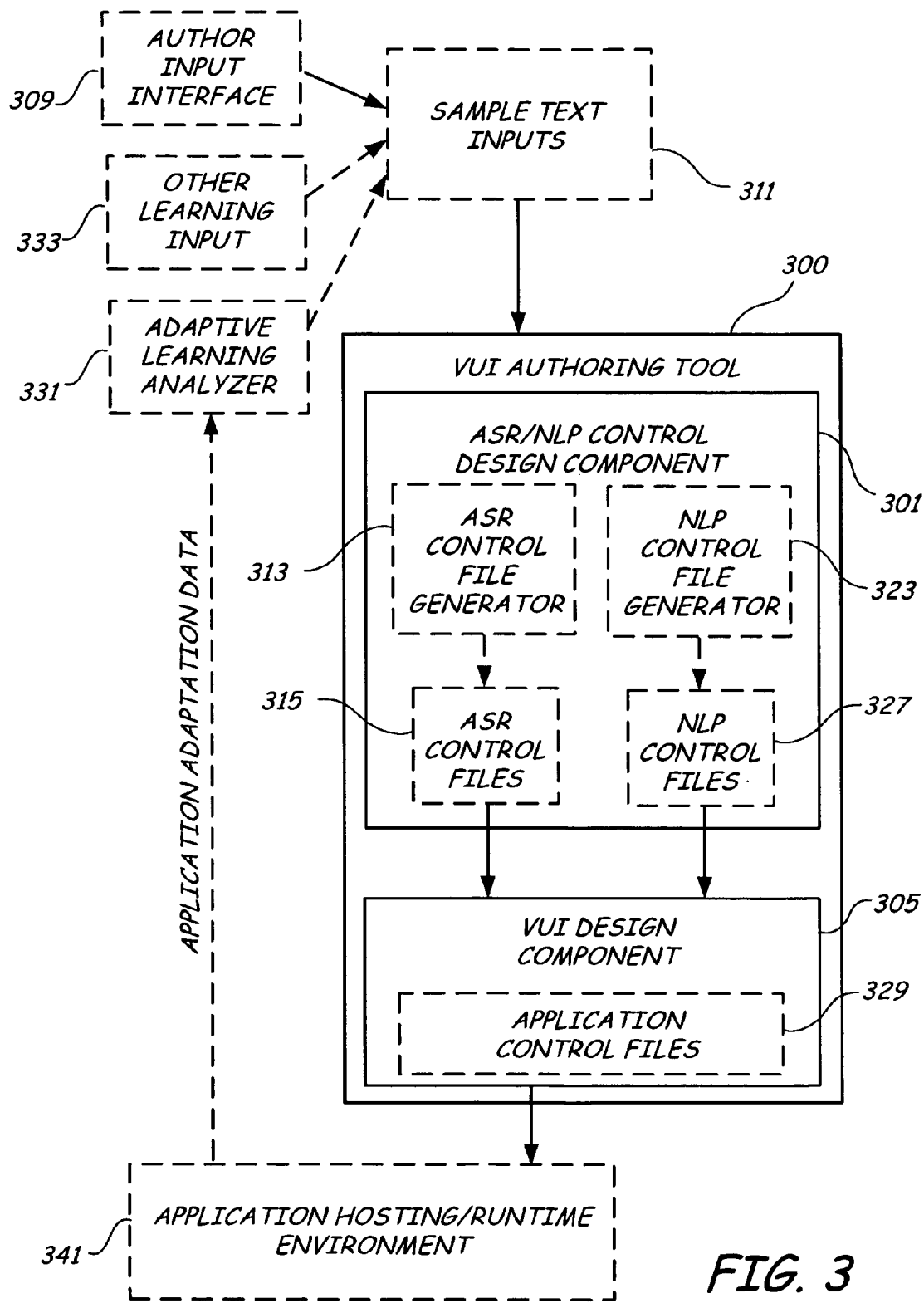
FIG. 3 depicts a block diagram of a voice user interface authoring tool, according to an illustrative embodiment.

One illustrative embodiment provides a voice user interface (VUI) authoring tool 300 that includes an automatic speech recognition and natural language processing (ASR/NLP) control design component 301, and a voice user interface (VUI) design component 305, as depicted in block diagram form in FIG. 3. The ASR/NLP control design component 301 includes ASR control file generator 313, which automatically generates ASR control files 315 based on sample inputs 311, and NLP control file generator 323, which automatically generates NLP control files 327 based on the sample inputs 311. VUI authoring tool 300 may receive sample inputs 311 entered by an author through author input interface 309, or through adaptive learning analyzer 331 or other learning input 333, which are further discussed below. Some of the elements of FIG. 3, such as ALA 331 and other learning input 333, are depicted in dotted lines to indicate that they are optional elements that may appear in some embodiments and not in others.

Figure 4:
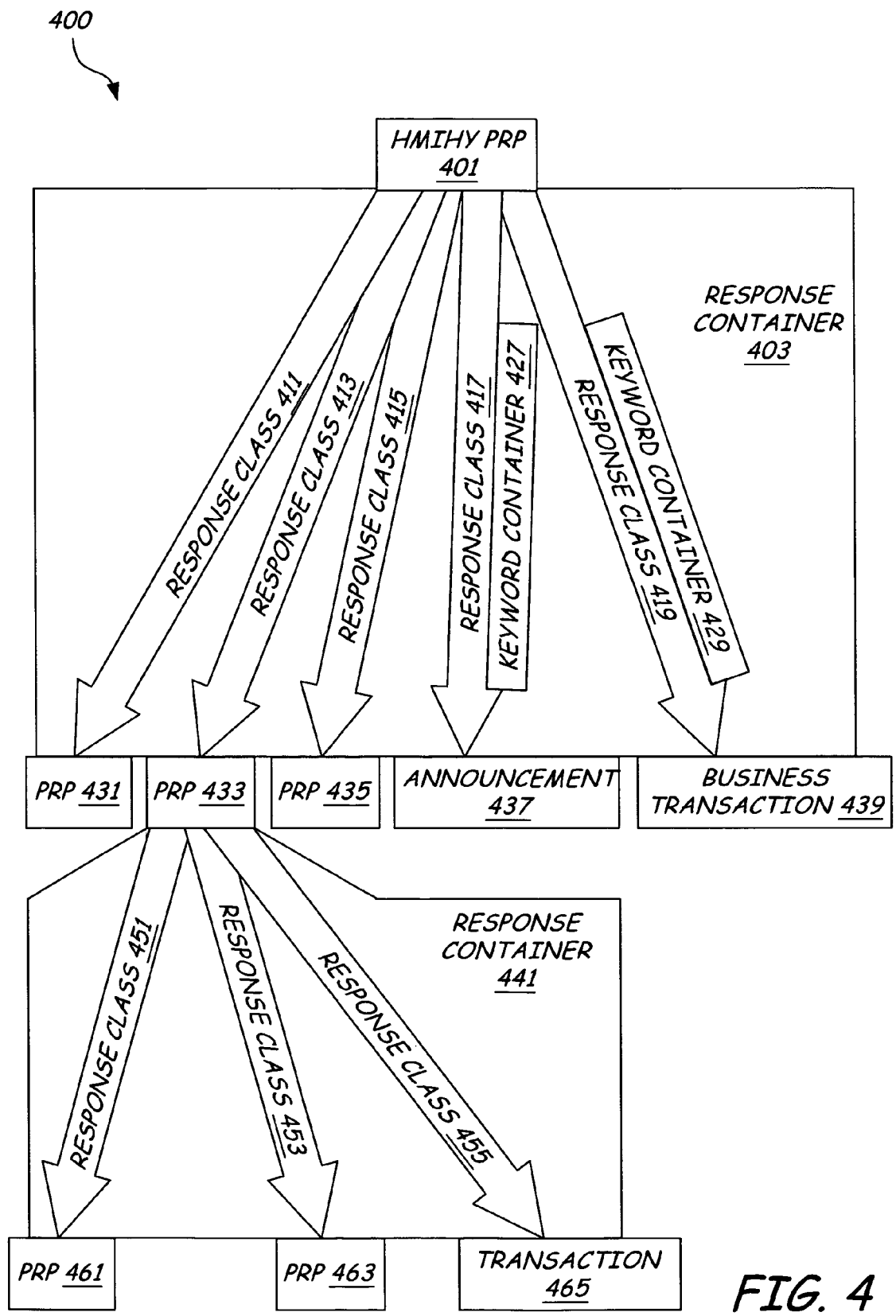
FIG. 4 depicts a flowchart of a voice user interface flow design corresponding to a voice user interface application, according to an illustrative embodiment.

The VUI design component 305 enables an author to design VUI flow design 400, as depicted in block diagram form in FIG. 4. This includes enabling an author to define one or more prompt/response processing (PRP) nodes and other types of action nodes, such as illustrative PRP nodes 401, 431, 433, 435, 461, and 463, and other illustrative action nodes 437, 439, and 465. PRP nodes may also be referred to simply as prompt nodes. PRP nodes 401, 431, 433, 435, 461, and 463 correspond to prompts which may be issued to a user as part of VUI flow design 400. ASR/NLP control design component 301 also enables specifying the classes of voice input response the user might give, such as illustrative response classes 411, 413, 415, 417, 419, 451, 453, and 455 of FIG. 4. A single author can use authoring tool 300 to create all the application control files 329 necessary to run a complete VUI, including ASR and NLP control files and VUI control files embodying a VUI flow design 400, in an application hosting/runtime environment 341.

The illustrative PRP nodes and action nodes and response class flow paths between them, depicted in FIG. 4, are provided as examples, while an application may have any number of PRP nodes and action nodes and flow paths between them. For example, it would be typical for many or all of the PRP nodes to have one or more flow paths leading from them to subsequent action nodes, although the potential response classes for most of the PRP nodes have been omitted from FIG. 4.

The VUI design component 305 may automatically generate a flow path for each response class, each flow path going from a PRP node to an action node, enabling an action node to be associated with each such response class flow path. These flow paths determine how the application may proceed at each prompt based on the response class corresponding to an actual voice input response from a user. This combination of PRP nodes and action nodes, and flow paths between them, may be referred to as the application's flow design or as its callflow.

After the author has specified the meanings of the different possible answers expected for each PRP node, and provided sample inputs for each of these meanings, VUI authoring tool 300 automatically creates a VUI by ASR/NLP control design component 301 automatically generating ASR and NLP control files and VUI design component 305 automatically generating flow paths corresponding to the response classes from PRP nodes to other action nodes. VUI authoring tool 300 is then enabled to provide a unified set of application control files 329 to an application hosting/runtime environment 341, to execute the VUI application and present the voice user interface to a user.

Action nodes may take any of a wide variety of application actions. As a few illustrative examples, action nodes 401, 431, 433, 435, 461, and 463 are PRP nodes, where the application prompts the user to provide a spoken response, and processes the user's response in order to extract its meaning. Illustrative action node 401 is a PRP nodes that serves as a starting point to VUI flow design 400, to begin a user's interaction with the application. A starting point PRP node is sometimes known as an HMIHY node, short for a "How may I help you" node, representative of a general invitation to a user to make use of the application. Voice user interfaces may be authored that use the English language or in any other languages, or have options for any of multiple languages, in various embodiments.

An author using VUI design component 305 may specify a response container, which may be designed in the ASR/NLP control design component 301, such as illustrative response containers 403 and 441, to govern the response processing at a PRP node, such as illustrative PRP nodes 401 and 433 respectively. The VUI design component 305 may then automatically generate a flow path for each response class in a particular response container. For example, if the response container 403 contains five response classes, then the VUI design component 305 may generate five response class flow paths 411, 413, 415 417, and 419, going from PRP node 401 each to their own action nodes, 431, 433, 435, 437 and 439, respectively. VUI authoring tool 300 may be configured to assign response containers such as illustrative response containers 403 and 441 containing the speech response classes, as part of specifying the flow paths between a PRP node and additional action nodes.

Figure 5:
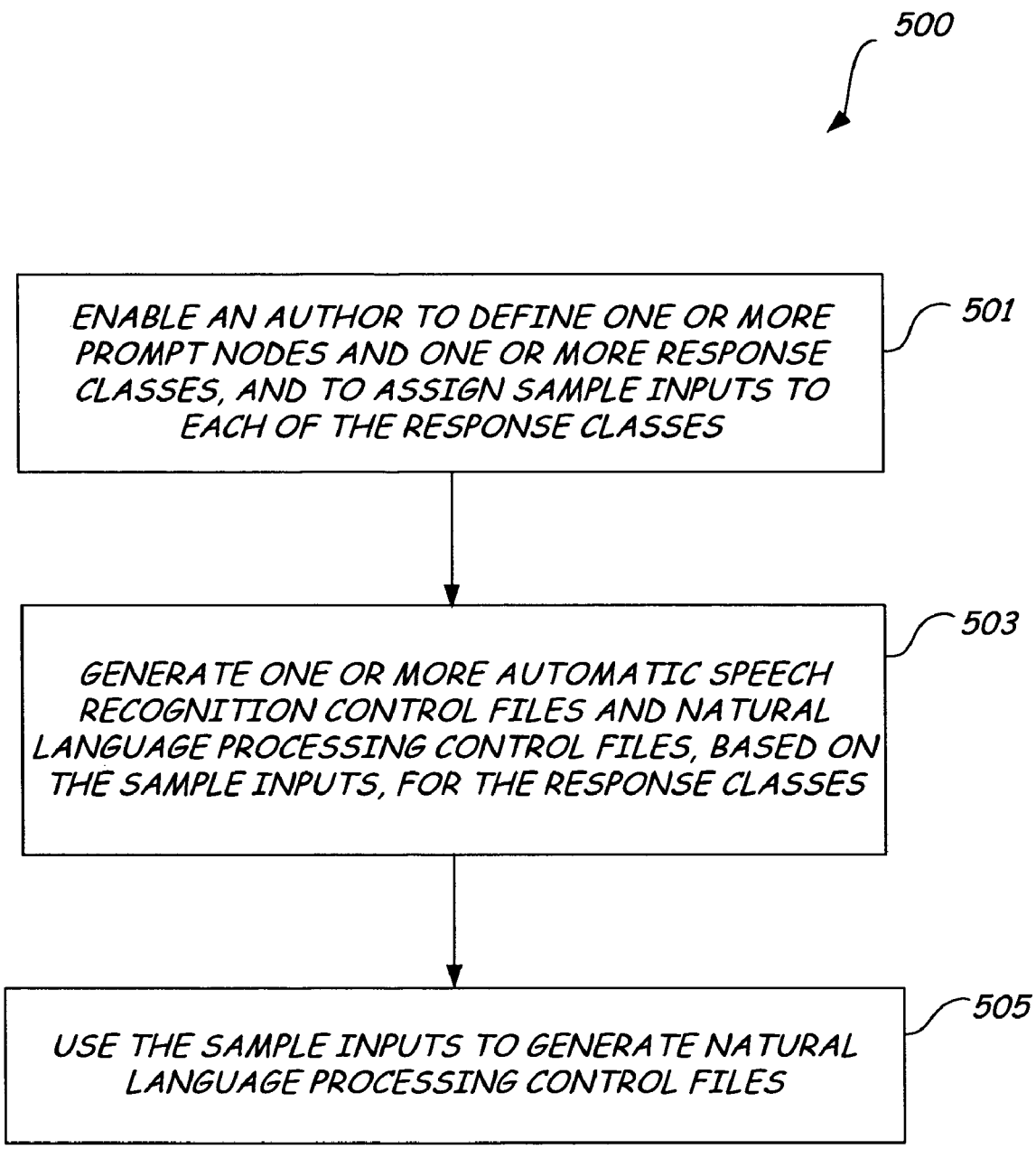
FIG. 5 depicts a flowchart of a method of authoring a voice user interface, according to an illustrative embodiment.

FIG. 5 depicts in flowchart form an illustrative method 500 of using VUI authoring tool 300 as implemented by a computing device. Method 500 includes step 501, of enabling an author to define one or more prompt nodes and one or more response classes, and to assign sample inputs to each of the response classes. Method 500 also includes step 503, of generating one or more automatic speech recognition control files and natural language processing control files, based on the sample inputs, for the response classes. Method 500 further includes step 505, of generating flow paths for the response classes from the prompt nodes.

Figure 6:
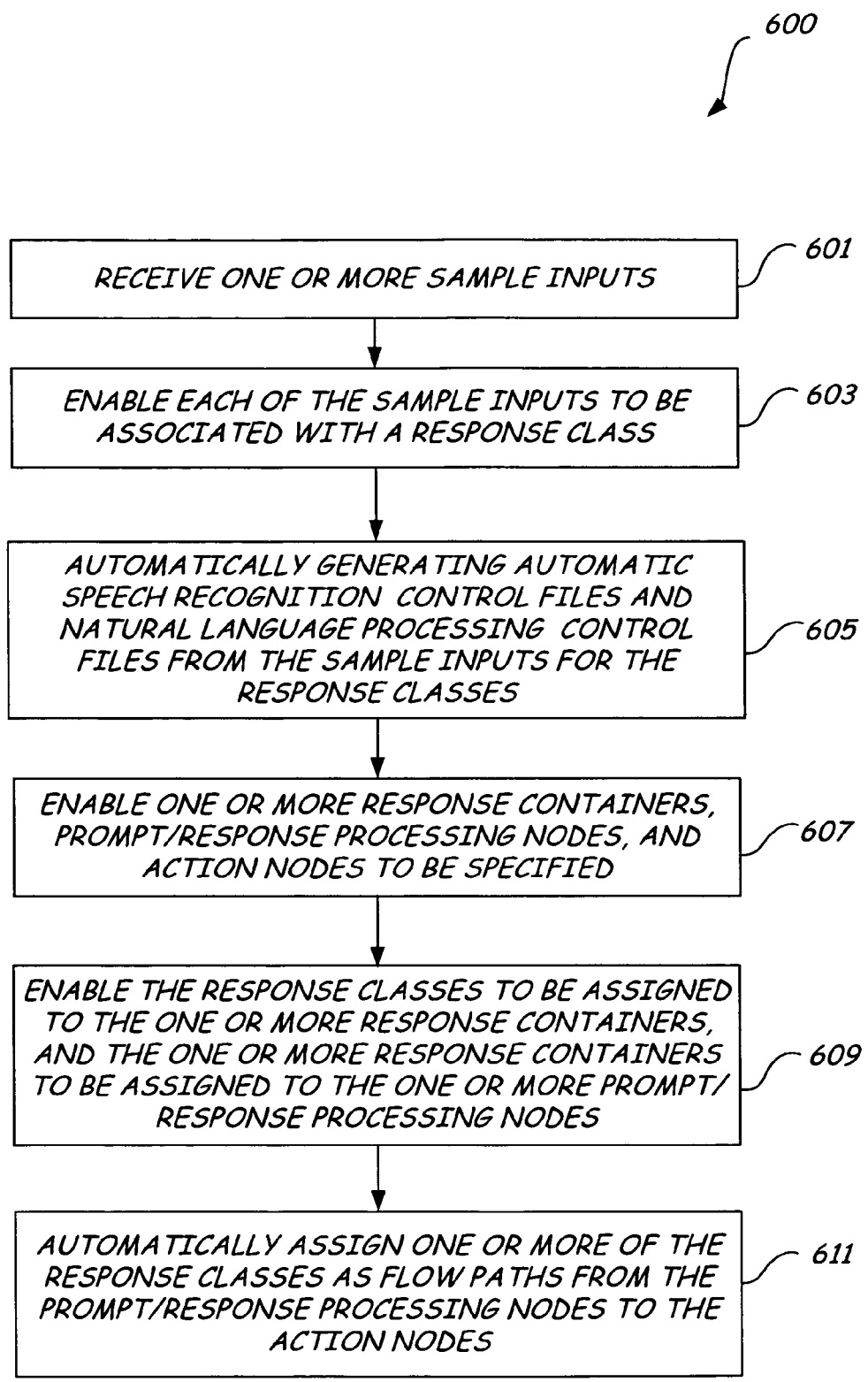
FIG. 6 depicts a flowchart of a method of authoring a voice user interface, according to an illustrative embodiment.

FIG. 6 depicts in flowchart form another illustrative embodiment 600 of using VUI authoring tool 300 as implemented by a computing device. VUI authoring tool 300 may be configured to receive sample inputs, as in step 601, such as sample inputs entered by an author through an author input interface 309. VUI authoring tool 300 may further be configured to perform step 603, of enabling each of the sample inputs to be associated with a response class, such as illustrative response classes 411, 413, 415, 417, 419, 451, 453, and 455, for example. VUI authoring tool 300 may further be configured to perform step 605, of automatically generating automatic speech recognition control files and natural language processing control files from the sample inputs for the response, classes. For example, the ASR/NLP control design component 301 may generate ASR/NLP control information for each of the PRP nodes in the VUI application, and all such ASR/NLP information for the application may be distributed across one or more files which the ASR/NLP control design component 301 generates. The ASR/NLP control design component 301 may use the sample inputs, and their authored associations with response classes, to generate the appropriate ASR and NLP control files. VUI authoring tool 300 may perform these operations entirely automatically; the author need have no expertise in the construction of ASR or NLP rules and grammars, and need not utilize separate tools unique to these separate processing engines. VUI authoring tool 300 may further be configured to perform step 607, of enabling one or more response containers, prompt/response processing nodes, and action nodes to be specified. VUI authoring tool 300 may further be configured to perform step 609, of enabling the response classes to be assigned to the one or more response containers, and the one or more response containers to be assigned to the one or more prompt/response processing nodes. And VUI authoring tool 300 may further be configured to perform step 611, of automatically assigning one or more of the response classes as flow paths from the prompt/response processing nodes to the action nodes.

A VUI application corresponding to VUI flow design 400 is then configured to run in an application hosting/runtime environment 341 and thereby to receive a speech input from a user, process the speech input into text form and process the input to model its meaning using control files generated by ASR/NLP control design component 301, and indicate which of the response classes assigned to each PRP node the input most closely corresponds with.

VUI authoring tool 300 enables the author to record any type of action to be executed in association with the action nodes. As another illustrative example of the action nodes of VUI flow design 400, action node 437 is associated with an announcement action. Rather than executing a PRP action or asking a question of the user, the announcement action provides an announcement to the user which may, for example, provide information relevant to a user's response to a previous PRP node such as PRP node 401. As yet another illustrative example of an action node, action node 439 is associated with a business transaction action. This may involve, for example, providing options for a user to make a payment, to purchase services or goods, to manage an account of the user's, or some other type of transaction. As those in the art appreciate, any other type of application action may also be employed with action nodes in other embodiments.

Referring to FIGS. 1, 2, and 3, the VUI authoring tool 300 may illustratively take the form of instructions comprised on a medium, such as hard disk drive 141, magnetic disk 152, optical disk 156, or memory 204, for example, and that are readable by a computing device, such as computer 110, remote computer 180, mobile device 201, or computing resources 224 and 226, for example. The instructions thereby enable a computing device to execute the voice user interface (VUI) authoring tool 300.

A speech input may be processed into text using ASR control files 315 derived from ASR control file generator 313 of ASR/NLP control design component 301, such as may be embodied in a Statistical Language Model (SLM). The result may be classified into one of a set of categories by ASR/NLP control design component 301, such as by using an NLP control file generator 323. NLP control file generator 323 may be used to create NLP control files 327 for associating speech inputs with the response classes of the VUI flow design. For example, NLP control file generator 323 may be developed by first measuring characteristics of the sample inputs, and using the measured characteristics of the sample inputs to create general statistical models of each of the response classes. The collection of characteristics and/or values representing the sample inputs may be represented in the form of feature vectors. Each feature vector from the sample inputs may be passed into the NLP control file, generator 323.

NLP control file generator 323 may be implemented in many different ways to use sample inputs to create NLP control files. For example, in a few various illustrative embodiments, NLP control file generator 323 may be implemented using a feature extractor, a Support Vector Machine (SVM), or a Maximum Entropy classifier (MaxEnt), for example. An SVM is an automated learning system based on statistical learning theory. In one illustrative embodiment, for example, the SVM uses a kernel function to model properties of the sample inputs, which have been measured by NLP control file generator 323. A radial basis kernel function is one particular option that may be used in the present embodiment, though any of a variety of other kernel functions may also be used. Those skilled in the arts related to Machine Learning and Natural Language Processing will appreciate the usefulness of support vector machines and a wide variety of other options in the context of these and other embodiments. An SVM is well-suited for modeling the characteristics of sample inputs to create NLP control file generator 323, and using NLP control file generator 323 to evaluate later speech inputs.

The NLP control file generator 323 may be used for indicating which of the response classes corresponds to subsequent speech inputs. Any new speech input that is evaluated to be similar to the model of one of the response classes of NLP control file generator 323 are classified as "in-class" for that response class. A speech input may be evaluated to be similar to any of the response classes modeled by the NLP control file generator 323, corresponding to the response classes within a given response container, such as illustrative response containers 403 and 441. There may be a keyword container contained in a given response class within a response container, and several keywords may be contained in a single response keyword container. Data that do not easily fit the learned model of any of the response classes modeled by NLP control file generator 323 may nonetheless be classified into whatever class is evaluated to be least different from the speech input, in one illustrative embodiment. Therefore, any speech input would be assigned to one or another pre-existing response classes within the given response container, in this illustrative embodiment.

In this embodiment, VUI authoring tool 300 may also provide a level of confidence indicating a quantified measure of the confidence that the indicated response class accurately represents a user's input. VUI authoring tool 300 may also provide options for corrective action if the level of confidence that the indicated response class accurately represents a user's input is below a threshold that may be selected by the author.

If the similarity of the input nevertheless falls below a selected threshold of confidence, indicating a substantial difference between the input and the modeled response class, a corrective action might be taken rather than merely proceeding as if the corresponding response class had been selected with certainty. The corrective action may, for example, take the form of an action to announce to the user that the input was indefinite, and to invite the user to repeat the input, or to provide other options such as entering an input through another means, such as by touchpad or keyboard. If several speech inputs in a row have failed to meet the confidence threshold for any of the keywords in a response container, it might be particularly appropriate to invite the user to enter an input using an alternative input mechanism, or to enter contact with a live assistant.

In another illustrative embodiment, speech inputs below a selected threshold of similarity to any of the modeled response classes may be classified as "out-of-class", or not corresponding to any of the response classes. A corrective action might then be taken, similarly to the case of an input falling below the threshold of confidence in the prior illustrative embodiment, except that in this case the speech input is not assigned to any of the response classes prior to the corrective action.

A wide variety of characteristics of the sample inputs 311, representing a wide variety of stylistic and usage variations of the intended keywords, may be measured by NLP control file generator 323. A large set of different characteristics may be measured for the same sample inputs. Measuring characteristics and using them to model language usage prevents the need to manually define rules or patterns for the keywords. Instead, the characteristics are automatically defined and modeled by VUI authoring tool 300.

Many other optional embodiments may be used for a classifier algorithm, including other types of one-class, two-class, and multi-class classifier algorithms. SVM algorithms and other methods of machine learning are the subject of ongoing progress, and the usefulness of both current and future machine learning methods for the present illustrative embodiments will be appreciated by those skilled in the art.

Levels of confidence can be assigned not only to a response class, but also to each of one or more individual keywords contained in a response class. An individual response class may also include a keyword container that may include one or more keyword values associated with that response class. Illustrative examples of these include keyword containers 427 and 429 of response classes 417 and 419, respectively. In another illustrative embodiment, a response container associated with a prompt node may contain a single response class that contains a single keyword container, while the keyword container includes one or more keyword values. A flow path may then be generated for each of the individual keyword values in the keyword container.

In an illustrative embodiment, "large" and "family size" may both be entered as examples in keyword container 429 for the keyword LargePizza, in association with a response class 419 for ordering a pizza, directed to a corresponding action node 439 for performing a delivery pizza purchase transaction, as one of many possible illustrative examples that may be embodied by the depiction of FIG. 4. Several different sample inputs may also be assigned to one of the keyword containers. A response container associated with one of the prompt nodes may contain a single response class which contains a unique keyword, and one of the flow paths may be generated automatically for the unique keyword.

An author can use VUI authoring tool 300, according to various embodiments, to create VUI applications, which may be implemented with a telephone system, a handheld or mobile computing device such as mobile computing device 201, a cellphone, a notebook or desktop such as computer 110, a server, or any of a wide variety of other computing environments. Voice user interface applications may be directed to any purpose, a few illustrative examples of which are: a system for taking orders for food delivery or takeout, such as for pizza; a customer service call-in application; a system for taking reservations for travel or lodging; a dashboard-embedded system for providing driving directions, weather or traffic information, movie times, etc.; a system embedded in a product for providing voice directions for assembling or using the product, such as for an automatic external defibrillator; an application hosted by a mobile or desktop computer, which may include anything from an Internet or database search application, a business management application, a video game, etc. Applications are also not limited to voice interface, but may also include text interface or any other interface that accepts a user's language as input.

As a particular example, an authoring tool according to this illustrative embodiment may be used to develop a consumer banking application. This may include an initial PRP node that asks, "How may I help you?" The author may assign to this initial PRP node a response container containing response classes corresponding to various user instruction inputs such as "account balance", "transfer funds", "stop payment on a check", and "need to speak with a customer service representative." Each response class might or might not also contain a single keyword container, associated with a model of corresponding keywords, which may also include rules for the inputs, in one embodiment. The VUI authoring tool enables an author to enter format rules for certain keywords, and uses the format rules to generate one or more of the ASR and/or NLP control files, in this illustrative embodiment. For example, if the above set of response classes for the banking application includes a response class for "account balance with account number", to handle the case where a speaker asks for the balance and gives the account number in the same input, then this response class may include an "account number" keyword container, which describes the format rules governing valid account numbers. For example, one format rule may be for a keyword to equal a sixteen-digit number. VUI authoring tool 300 is thereby able to use a combination of rule-based and statistical models to generate the ASR and NLP control files for each node in a VUI application, based on the inputs provided and assigned to respective response classes by the author.

In some applications, the keyword containers associated with each response class are each configured for only a single keyword. For example, a response container may be connected from an action node associated with the prompt "What size pizza would you like?" Each keyword container may then correspond to a single keyword for the pizza size, together with any pre/post-amble around the size e.g. "I'd like a large please", where the keyword is modeled statistically but without supplemental rules, as with the account number example.

The keyword container of a single response class may still contain several alternative examples for indicating the corresponding response. A keyword may involve a semantically tagged list of synonyms that represent only the keywords of a semantic concept. For example, SmallPizza may be a keyword and it may contain the keyword examples, "small", "junior", "seven inch", and "petite", for example, while the keyword container of a different response class may contain the keyword examples "extra large", "family size", "really big", and "mondo", all of which correspond to a LargePizza keyword.

Other keywords, may be described entirely by rules, and do not have synonyms, as with the example of account numbers. The set of rules may define various sequences of tokens which might constitute the expression of the keyword value. The tokens may include, for example, spoken words, digits, or other recognizable language elements.

A keyword container may include multiple keywords. For example, PizzaSize could be a keyword container, containing the keywords SmallPizza, MediumPizza and LargePizza. A response class may or may not contain a keyword container, but a response class may still have training sentences for semantically untagged portions of inputs.

The VUI authoring tool 300 may present all existing response containers, along with the response classes within each response container, and any keyword containers within response classes, in a "tree view" such as that of VUI flow design 400 in FIG. 4. With the tree view, the author may use typical "file explorer" interface features to select, create, delete, copy, move and edit the various nodes, flow paths, containers and other elements. When a response class is selected, the editing pane of the VUI flow design 400 may display a wide variety of example responses for that response class. In one embodiment, when a response class is first created, there are no examples, and this pane is empty. The VUI authoring tool 300 enables the author to enter new examples, import examples from various file formats, and perform data mining to mine examples from various data sources, in an illustrative embodiment. If the response class contains a keyword container, then the examples must contain a valid example of the keyword (e.g., a valid account number); the VUI flow design 400 automatically identifies the portion of the example which is the keyword value, and highlights this to the user, in this illustrative embodiment.

Another illustrative embodiment uses an adaptive learning analyzer (ALA) 331 to continue adding learned inputs to the sample inputs, to continue enlarging the basis of input data and to generate revised ASR and NLP control files. This feedback loop allows the system to automatically learn from actual caller interactions with the system, greatly reducing the need for periodic tuning effort. This is only one example of learned input, which may include any other type of learning input 333. Learned input includes input identified through any process of analyzing information relevant to the VUI authoring tool 300, this information possibly being obtained in the course the application being used, or obtained from other applications, or obtained from other sources.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As one example, while the example of speech input is discussed substantially, other embodiments of an authoring tool encompassed herein may be applied to text entry or any other form of user input.

What is claimed is:

1. A method of generating a voice user interface implemented by a computing device, the method comprising:
   providing a response container for governing voice response processing for the voice user interface;

providing a plurality of nodes associated with the response container and defining acts to be performed;

providing a plurality of response classes defining types of voice input responses related to the plurality of nodes associated with the response container;

automatically generating a flow path for each of the plurality of response classes in the response container, each flow path spanning from a first node defining a first act to be performed to a second node defining a second act to be performed, wherein the generating the flow path for each of the plurality of response classes determines a callflow sequence of execution of acts of the plurality of nodes according to a response class associated with a voice input response;

receiving meanings of different possible answers expected in response to the plurality of nodes;

receiving sample inputs associated with each of the received meanings;

automatically generating control files to extract a meaning and to determine a response class associated with a received voice response based on the received meanings of different possible answers and the received sample inputs; and automatically assigning a flow path to the received voice response based on an extracted meaning and a determined response class for establishing a callflow sequence in response to the received voice response.

2. The method of claim 1, further comprising enabling an author to configure one or more additional response containers and to assign one or more of the response classes to the response containers.

3. The method of claim 2, further comprising enabling an author to associate one or more of the additional response containers with a corresponding prompt node.

4. The method of claim 1, wherein a response class includes a keyword container comprising one or more keyword values, wherein a processor automatically generates a flow path for each of the keywords associated with the response class.

5. The method of claim 1, wherein the automatically generating control files further comprises assigning automatic speech recognition and natural language processing control files to the response containers.

6. The method of claim 1, wherein the providing a plurality of nodes comprises providing at least one prompt node prompting a spoken response to be provided.

7. The method of claim 1, wherein the providing a plurality of nodes comprises providing at least one action node defining an action to be performed.

8. The method of claim 7, wherein the action node comprises a node associated with an announcement action.

9. The method of claim 7, wherein the action node comprises a node associated with a transaction.

10. The method of claim 1, further comprising using learned sample inputs to generate revised automatic speech recognition component control files.

11. The method of claim 1, further comprising using format rules to generate one or more natural language processing control files.

12. The method of claim 1, further comprising:

measuring characteristics of the received sample inputs; and using the characteristics to create a classifier configured for providing an indication of which of the response classes corresponds to subsequent speech inputs.

13. The method of claim 12, further comprising evaluating a level of confidence for the indication of which of the response classes corresponds to subsequent speech inputs.

14. The method of claim 13, further comprising providing one or more options for corrective action if the level of confidence for the indication of which of the response classes corresponds to a subsequent speech input is below a selected threshold.

15. A computer readable storage medium comprising instructions readable by a computing device, the instructions enabling the computing device to execute a voice user interface authoring tool, the instructions comprising:

an automatic speech recognition component; and a voice user interface design component implemented on a processor of the computing device to provide a response container for governing voice response processing for a voice user interface, to provide a plurality of nodes associated with the response container and defining acts to be performed, to provide a plurality of response classes defining types of voice input responses related to the plurality of nodes associated with the response container, to automatically generate a flow path for each of the plurality of response classes in the response container, each flow path spanning from a first node defining a first act to be performed to a second node defining a second act to be performed, wherein the generating the flow path for each of the plurality of response classes determines a callflow sequence of execution of acts of the plurality of nodes according to a response class associated with a voice input response, to receive meanings of different possible answers expected in response to the plurality of nodes, to receive sample inputs associated with each of the received meanings, to automatically generate control files to extract a meaning and to determine a response class associated with a received voice response based on the received meanings of different possible answers and the received sample inputs and to automatically assign a flow path to the received voice response based on an extracted meaning and a determined response class for establishing a callflow sequence in response to the received voice response.

* * * * *